United States Patent [19]

Lahti

[11] 4,324,289
[45] Apr. 13, 1982

[54] ENVIRONMENTAL HEATING AND COOLING APPARATUS

[76] Inventor: Raymond L. Lahti, 7520 Pinen Dr., Knoxville, Tenn. 37902

[21] Appl. No.: 145,713

[22] Filed: May 1, 1980

Related U.S. Application Data

[63] Continuation-in-part of Ser. No. 923,907, Jul. 12, 1978, abandoned.

[51] Int. Cl.³ ............................................. F25B 29/00
[52] U.S. Cl. ................................... 165/48 S; 165/10; 98/31; 126/430
[58] Field of Search ............. 165/48 S, 59, 45, 104 S, 165/10; 98/31; 126/428, 429, 430, 436, 400

[56] References Cited

U.S. PATENT DOCUMENTS

| | | | |
|---|---|---|---|
| 2,484,127 | 10/1949 | Stelzer | 126/430 X |
| 3,412,728 | 11/1968 | Thomason | 126/429 |
| 4,006,856 | 2/1977 | Nilsson | 98/31 X |
| 4,029,258 | 6/1977 | Groth | 126/430 X |
| 4,051,999 | 10/1977 | Granger et al. | 126/400 X |
| 4,183,398 | 1/1980 | Ehrke | 126/429 X |
| 4,197,993 | 4/1980 | Trombe et al. | 98/31 |

Primary Examiner—Albert W. Davis
Assistant Examiner—Margaret A. Focarino
Attorney, Agent, or Firm—Geoffrey D. Kressin

[57] ABSTRACT

An apparatus which is in one embodiment structurally integrated with a building and has a solar collector plate with a front side and back side. The collector is mounted a spaced distance from an insulated building interior wall to form a preheating channel with one of its sides. Roof mounted solar admitting panels are mounted spaced from the other side of the collector to form a second or primary heating channel. A collection chamber is in circulating air communication with both channels and allows air to pass from the preheating channel to the primary heating channel. During heating air passes through preheating channels and primary heating channels and flows to a storage unit carried beneath the structure or cycled to the building structure. A valve to the ambient environment allows air to flow into the storage unit. When the storage unit is cooled by introduction of circulating air through a valve joining the apparatus with the building environment. The building environment is selectively exhausted by valves to the collection chamber for reheating or recycling or to the storage unit for recycling. An alternate embodiment has a solar collector plate mounted within a frame such that the collector is a spaced distance from an existing exterior roof to form a preheating channel with one of its sides. Solar admitting panels are mounted to frame and spaced parallel to the other side of the solar collector to form a second or primary heating channel. A collection chamber is formed at one end of the frame by its sides. The collection chamber is in circulating air communication with both the preheat and primary heat channels and allows air to pass from the preheat channel to the primary heat channel. In all other respects, the alternate embodiment is substantially similar to the above described embodiment.

8 Claims, 7 Drawing Figures

ENVIRONMENTAL HEATING AND COOLING APPARATUS

This application is a continuation-in-part of application Ser. No. 923,907 filed July 12, 1978, and now abandoned.

This invention relates generally to the use of the ambient environmental conditions to heat and cool buildings and more particularly to the use of common building elements such as walls, ceilings, floors and other structural parts in either existing buildings or newly constructed buildings to form necessary structures to control air temperatures and other environmental factors within the building.

The use of solar energy to heat various building structures is well known. Various methods of utilizing solar energy for such purpose have been used. For example, one system such as described in U.S. Pat. No. 405,999 issued to Floyd Randolph Granger on Oct. 4, 1977 discloses the use of the attic of a house structure to collect heated air which is connected to a storage unit carried beneath the house structure. When the air in the attic heated, it is drawn through the ducts by a blower and passed through the storage unit. Heat may, at some later time, be passed into the house when warming is desired.

Another solar heating apparatus such as described in U.S. Pat. No. 4,029,258 issued to F. Groth on June 14, 1977 discloses the use of solar energy to transfer heat from both sides of a collector to circulating air which air is subsequently passed through a storage unit consisting of rocks, which rocks are thereby heated. Again when the ambient conditions are such that the environment within the structure requires heat, heat is drawn in by use of air from the storage area to the building environment.

Still other art discloses the use of various building structures to form channels in which air could be circulated to carry it from a solar collecting point to a storage area for use later.

However, these various inventions suffered certain disadvantages. Among the various disadvantages was the fact that some of these systems using air as the transfer medium could only absorb a limited amount of heat from the collector and transfer it to the storage area. One of the primary reasons for limited efficiency was the fact that the air itself was in contact with the collector for a short period of time.

A second similar problem occurred in the storage area in that the air passing through the storage medium does not come in contact with the air long enough to effect an efficient transfer.

During the cooling cycle, the storage medium must be cooled by ambient air. However, the drawing of the air over the storage medium causes a less than efficient transfer which in turn decreases the efficiency of the cooling within this so called storage area.

It is therefore one object of this invention to provide a system which increases the efficiency of tranferring the heat from the collector. A second object is to provide a more efficient unit for collecting the heat or cold as it is carried in by the air. Another object of this invention is to provide a more efficient cooling system. A still further object is to provide a system which is inexpensive to manufacture and is subject to be installed in structures using conventional construction techniques without the necessity of large amounts of specialized duct work and other components which are used in addition to those which might commonly go into a building using present construction techniques. A still further object is to provide a system which is relatively inexpensive and maybe installed on existing structures without any need to completely renovate the existing building. With the ever present rising cost of construction and all sources of energy, it is another object of this invention to provide an inexpensive system and an energy efficient system which utilizes readily available solar energy and other ambient environmental conditions.

These and other objects and advantages will become apparent upon the reading of the following specification and drawings wherein.

In accordance with the various features of the invention, an apparatus for controlling building environment by use of circulating air and the ambient environment is provided. The apparatus includes a solar collector having a frontside and a backside. The collector is oriented with the sun so as to be irradiated when the sun is shining. The collector which is heated from the sun irradiation only on one side, uses both sides as a heating element. During heating operation, circulating air is passed into a channel and over one side of the collector which serves as a preheating means to evaluate or raise the temperature of said air. The preheated circulating air is then passed through a collection chamber to a primary heating means or channel which is in heating contact with the other side of the collector and serves to elevate the temperature over and above the temperature attained during preheating. The apparatus is intended to provide cooling as well as heating and is therefore equippment with a system for "storing" heat or cold. The heat or cold is transmitted to the storage unit by means of circulating air which may be drawn from the primary heating means in the case of heating or alternatively from the ambient environment in the case of cooling. Means is also provided for introducing the circulating air from the storage area to either the building environment or returning the air to the preheating means for heating. Directing the air to the building environment or to the preheating means is determined by the conditions desired within the building environment. In order that the circulating air may move through the building environment, means for exhausting are also provided. Said exhausting means directs the flow of air from the building environment to the collection chamber. A second exhausting means directs air flow to the storage means. During the various phases of operation, a means for circulating the air is provided.

Figure 1:
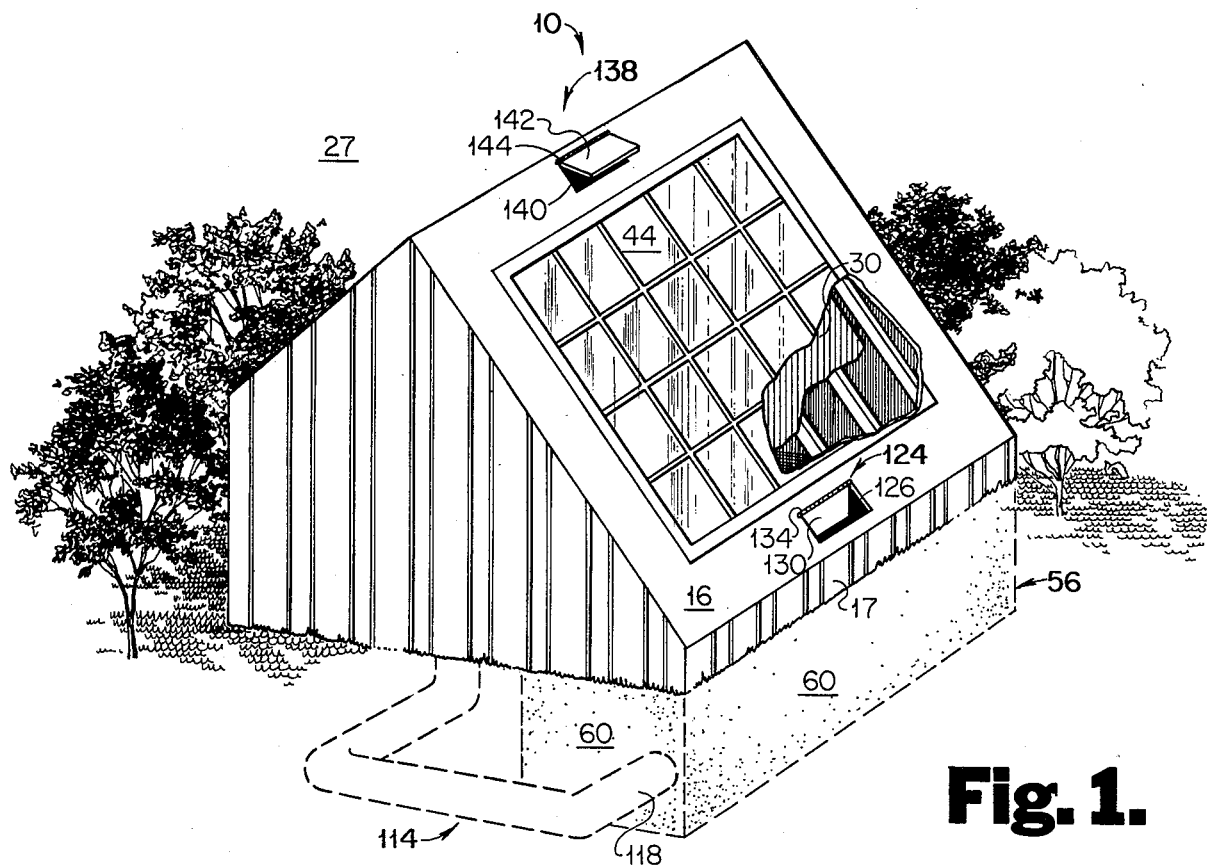
FIG. 1 is a prospective view of a structure utilizing the features of the present invention with parts broken away for purposes of clarity, illustrating a position of the heating system and air handling system.
Figure 2:
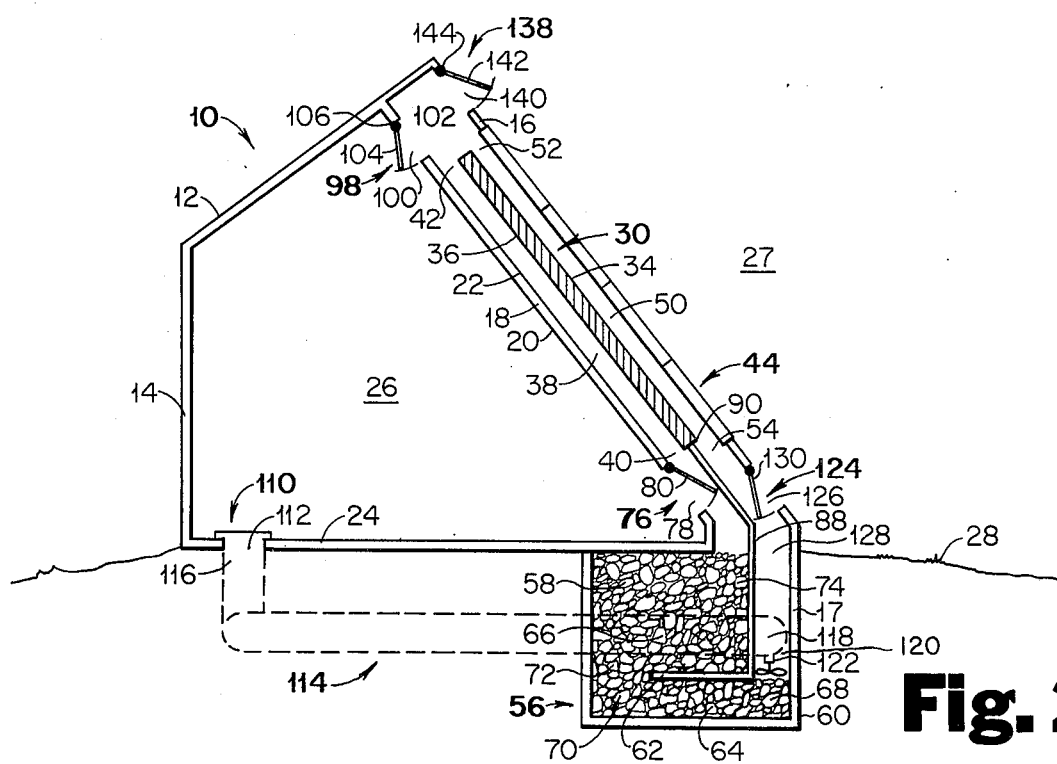
FIG. 2 is a vertical section through a structure as shown in FIG. 1 utilizing the present invention.

Referring now to the drawings, a structure 10 is shown in FIG. 1 and FIG. 2. The structure is equipped with a roof 12 and wall 14 which are of conventional design. A second roof 16, oriented toward the sun, and second wall 18 within an inner surface 20 and an outer surface 22 is shown and again is constructed in accordance with conventional methods. A floor 24 completes the essential conveniental elements of the structure. Roof 12, walls 14 and 18 and floor 24 may be insulated in accordance with standard building practices of the locale in which the structure 10 is located. Additionally, roof 12, walls 14 and 18, and floor 24 define the building environment 26 of the structure 10. The entire structure is situated within an ambient environment 27 which is herein defined to be the weather conditions on any given day. The structure rests on ground 28.

Means for collecting the solar heat is provided. A solar collector 30 is shown in FIG. 1 as a flat plate having a front surface 34 and a back surface 36. The solar collector may be manufactured from a suitable material such as anodized aluminum and the like which is capable of absorbing solar radiation and becoming hot as the result thereof. The solar collector 30 is disposed in a position parallel to wall 18 but spaced away from outer surface 22 so as to form a channel 38. The collector 30 is additionally oriented so as to receive an optimum amount of sun radiation. Channel 38 allow circulating air to pass through it from its admitting end 40 to its exhausting end 42. As a means of preheating, the circulating air passes into channel 38, through admitting end 40 and comes into contact with the back surface 36 of the collector 30 which is heated by the sun. The heat from surface 36 is then transmitted to the circulating air which in turn passes through exhausting end 42. Exhausting end 42 is in circulating air communication with a collection chamber 102. Air may therefore be deposited within said collection chamber.

To protect the collector from the ambient environment, solar admitting panels 44 are provided. These panels are flat with two surfaces. The admitting panels 44 are manufactured from a material such as glass, plastic or the like which will allow the radiation from the sun to pass through them and strike the collector 30. The panels 44 are disposed with one surface parallel to the front surface 34 of collector 30 and attached to roof 16 in such a manner as to form channel 50 between front surface 34 of the collector and one surface of panels 44. The other surface of the admitting panels 44 are faced to the ambient environment 27 and serves as an exterior cover for structure 10. Channel 50 has an admitting end 52 in circulating air communication with collection chamber 102 and an exhausting end 54. This allows air to be admitted through end 52 of channel 50 from the collection chamber, pass through channel 50, and be exhausted through end 54. As a means of primary heating, circulating air is drawn in through end 52 into channel 50. Surface 34 of the collector 30, which has been heated by solar radiation, then comes into contact with the circulating air and thereby transmits heat to it which raises the temperature again. In turn the heated air is exhausted through end 54.

Conditions in the ambient environment 27 are not always the same as those desired within the building environment 26. Therefore, means for storing heat or cold for later use is provided. Such means, designated generally as a thermal storage unit 56 in FIG. 1 and FIG. 2, is comprised of a medium 58 which is porous and allows air to circulate therethrough. The medium 58 may be any suitable material such as by example stones or rock. The storage unit may be made by excavating the ground to form containing walls 60 and placing of the medium 58 in the excavation and covering it with floor 24. Additional construction above ground on said containing walls may be by conventional methods. A baffle 62 is placed within the unit 56 so as to divide the unit into a lower level 64 and an upper level 66. Lower level 64 has an admitting end 68 and an exhausting end 74. Circulating air may then be admitted through end 68, passed through lower level 64, and exhausted through end 70. End 70 is in circulating air communication with end 72. Air, therefore, passes from end 70 into admitting end 72, passes through upper level 66, and is exhausted through end 74. As heated or cooled air passes through the storage unit 56, the heat or cold is transferred to the medium 58 and stored for later use. One level storage acts as a primary thermal sink and the other level storage acts as a secondary thermal sink.

Figure 4:
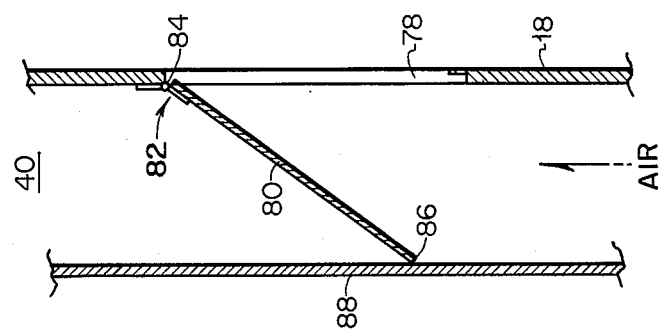
FIG. 4 is a vertical section of FIG. 3 showing a typical valve.
Figure 3:
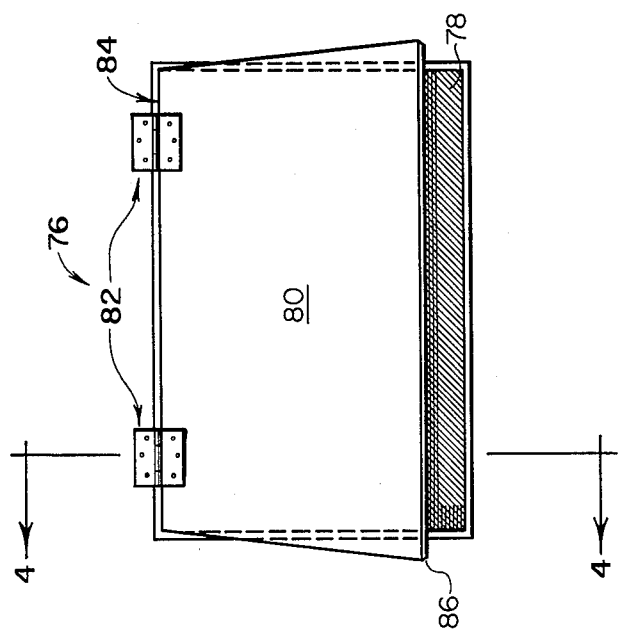
FIG. 3 is a view of a typical valve as utilized at various points in the invention shown in FIG. 2 and FIG. 7.
Figure 5:
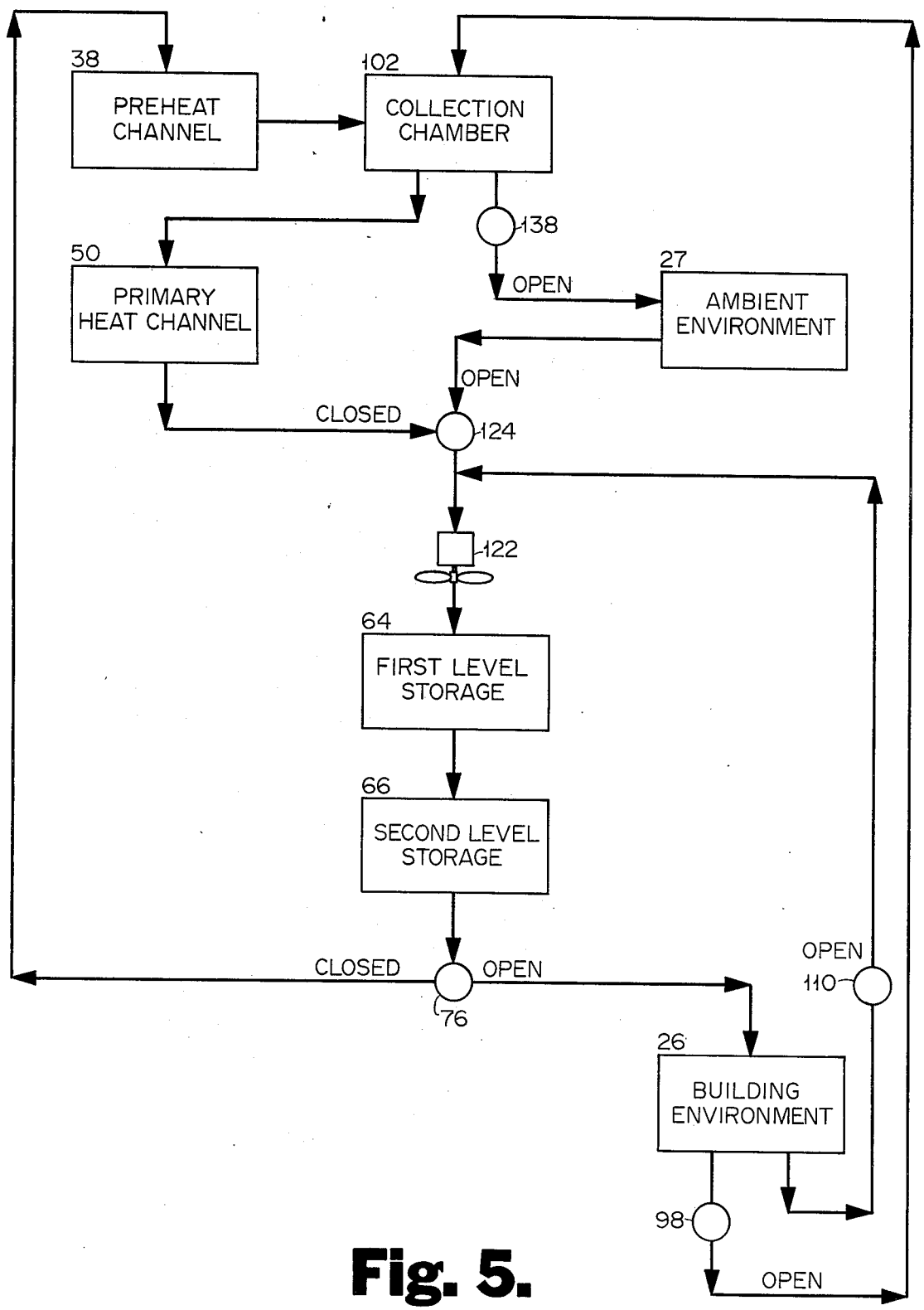
FIG. 5 is a flow diagram illustrating how the system functions when in operation.
Figure 6:
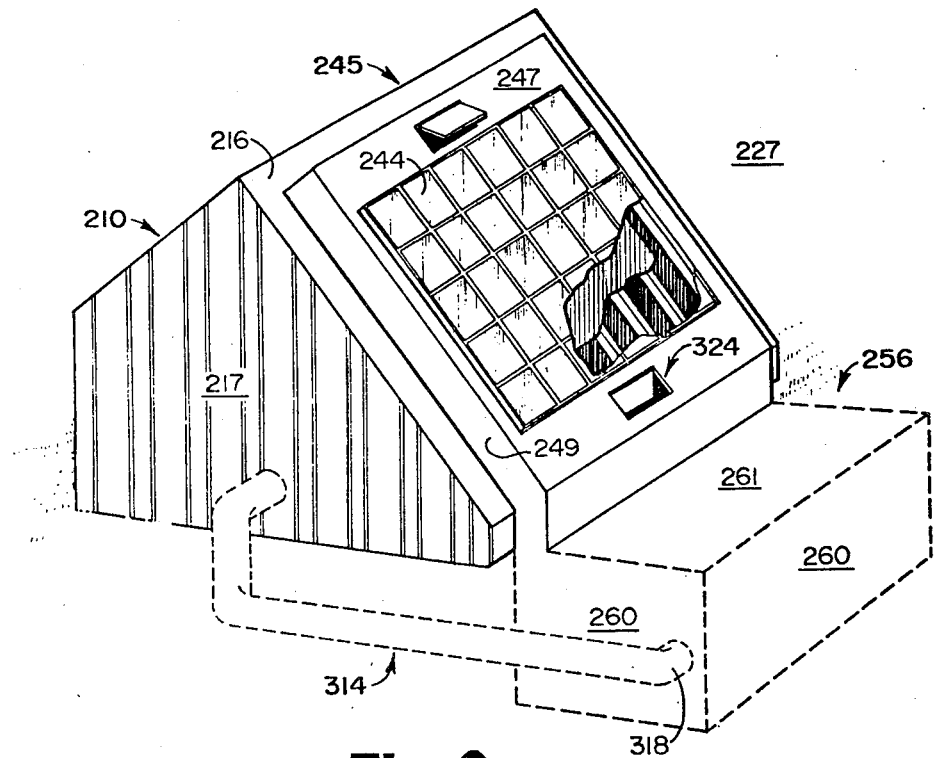
FIG. 6 is a prospective view of an existing structure utilizing the features of the present invention which is added to such structure with parts broken away for purposes of clarity, illustrating a position of the heating and cooling system and air handling system.

Means is provided for directing the circulating air from the storage unit 56 to either the building environment 26 or to the preheating channel 38. As is shown in FIGS. 5 and 6 as well as FIG. 2, valve 76 may be used for directing the circulating air. An opening 78 through wall 18 is provided in order to allow circulating air to pass from storage unit 56 from end 74 of said storage unit into said building environment. As a means to retard or restrict flow through opening 78, cover 80 is shown. Cover 80 as shown in FIGS. 3 and 4 is a substantially flat plate and is integrally attached by hinges at 82 along one of its edges to one of the edges 84 of opening 78. When the cover 80 is in its closed mode, its edges come in air tight contact with edges of opening 78 and restrict air from circulating from end 74 of the storage unit through opening 78 into building environment 26. Circulating air is then passed from end 74 of the storage unit to admitting end 40 of the preheating channel 38. When valve 76 is in its open mode, cover 80 is pivoted about hinges 82 until the edge opposite 84, 86 come into contact with a dividing wall 88 as shown in FIG. 3 and FIG. 4. Dividing wall 88 separates channels 38 and 50. One edge of dividing wall 88 is attached to the lower edge of collector 30 and 90. The other edge of said dividing wall 88 is attached to baffle 62 at 96. Circulating air from end 74 of the storage unit is then directed by cover 80 through opening 78 into the building environment 26. Additionally, the circulating air is restricted from flowing into admitting end 40 of the preheating chamber 38. The valve cover 80 is operated either manually or by means of a conventional motor, solonoid or the like which may be controlled for example by thermostat or conventional switch. Typically the valve cover 80 could be manufactured from any substantially rigid material such as wood or metal. Hinge 82 is any typical conventional hinge.

Means for exhausting the building environment 26 is provided. A valve 98 similar to that shown in FIG. 3 and 4 is shown near the apex of structure 10 in FIG. 2 similar to valve 76. The valve 98 is comprised of a opening 100 through wall 18 similar to opening 78 of valve 76. Opening 100 allows circulating air to flow from building environment 26 through it to collecting chamber 102. Valve 98 additionally has a flat cover 104 similar to cover 80 of valve 76. Cover 104 is pivotally connected at one of its edges by a hinge at 106 to one side of opening 100. When valve 98 is in the open mode, cover 104 is pivoted about the hinge at 106 inwardly toward environment 26 and away from collecting chamber 102. This then allows circulating air to pass through opening 100 into chamber 102. When valve 98 is in the closed mode, cover 104 is pivoted such that it covers opening 100 and restricts circulating air from flowing from environment 26 to chamber 102. The valve cover 104 may be manufactured from any substantially rigid material such as wood or metal. The hinge is a conventional hinge readily available commercially. The valve 98 is operated either manually or by means of a conventional motor which in turn may be controlled by thermostat or other conventional switch.

Additional exhausting of building environment may be desired. Therefore another means for exhausting is provided. In this regard, a valve 110 is provided which is shown as a conventional register in FIG. 2. An opening 112 through floor 25 is provided. A duct 114 having a first end 116 is attached to valve 110 through opening 112 in circulating air communication with environment 26 of the building. The other end 118 of duct 114 opens into circulating air communication with admitting end 120 by blower 122. Valve 110 covers opening 112 and may be selectively opened or closed. When valve 110 is in the open mode, circulating air may flow from environment 26 through opening 112 into end 116 of duct 114, through duct 114 to the admitting end of 120 of blower 122. When valve 110, is selectively closed, circulating air is restricted and prevented from flowing through opening 112.

Air from the ambient environment 27 is sometimes desired. Therefore, means for receiving air from the ambient environment 27 into the circulating air system is provided by way of valve 124 shown in FIG. 1 and 2 and is similar to valve 76. An opening 126 through roof 16 is provided near and above ground level 28. To maximize the efficiency of the system, such opening 126 is near ground level but need not be. Additionally, the opening 126 is oriented to enter below the exhausting end 54 of primary heating channel 50. The opening 126 is similar to opening 78 of valve 76. Air enters through opening 126 into a channel 128 which is defined by wall 88 and roof 16 and outside wall 17. A cover 130 is provided and is attached by means of a hinge at 134 to the roof 16 at the edge of opening 126 nearest the solar admitting panels 44. Additionally, the cover 130 is attached to allow it to pivot about the hinge inwardly into channel 128. When valve 124 is in the closed mode, cover 130 is shut and restricts flow from the ambient air through opening 124 by covering said opening. Circulating air is free to move from exhausting end 54 of primary heating channel 50 into channel 128. When valve 124 is in the open mode, cover 130 is rotated about the hinge until the edge opposite the hinged edge contacts wall 88 in such fashion as to prevent air from flowing from exhausting end 54 of primary heating channel 50. Air is free to flow from environment 27 through opening 126 into channel 128. Again as before such cover 130 may be manufactured from a rigid material such as wood or metal. Typically valve 126 may be operated manually or by motor as other valves previously described. Said motor may be activated by theremostatic switch or manually operated switch. The hinge may be any commercially available hinge.

Means for exhausting circulating air to the ambient environment 27 is provided. A valve 138 is shown in FIG. 1 and FIG. 2 at the apex of the structure 10 and is again similar to valve 76. Said valve 138 consists of part of an opening 140 through roof 16 above the solar admitting panels 44. Opening 140 opens into chamber 102. This allows circulating air to flow from collecting chamber 102 through opening 140 into environment 27. The opening 140 is similar to opening 78 of valve 76. A cover 142 is provided to fit over opening 140. Cover 142 is attached by one edge to the edge of opening 140 by a hinge at 144 located furthest distance from solar admitting panels 44. Additionally, cover 142 is attached in such fashion as to allow said cover 142 to pivot outwardly away from collecting chamber 102 about the hinge. When valve 138 is in the closed mode, cover 142 fits over opening 140 and restricts circulating air flow from chamber 102 through said opening to ambient environment 27. When valve 138 is in the open mode, cover 140 is pivotally rotated about the hinge toward the ambient environment 27 and away from chamber 102. Circulating air may flow from chamber 102 through opening 140 into ambient environment 27. The valve 138 may typically be operated manually or by a motor. Said motor could be activated thermostatically or manually operated switch. The cover 140 itself could be manufactured from a rigid material as by example wood or metal. Again the hinge may by any suitable commercially available hinge.

Air must be circulated through the system. Means for circulating the air, therefore, is provided. Such means is a conventional blower 122 or the like. Blower 122 is disposed within a space defined by one wall of storage unit 56 and wall 88 and below duct end 118. Air is drawn from channel 128 and end 118 of duct 114. Circulating air passes through blower 122 and is blown into the admitting end 68 of storage unit 56. Blower 122 provides means for circulating air throughout the entire system. Blower 122 is of any conventional design capable of circulating air. Blower 122 may be controlled manually or thermostatically.

Figure 7:
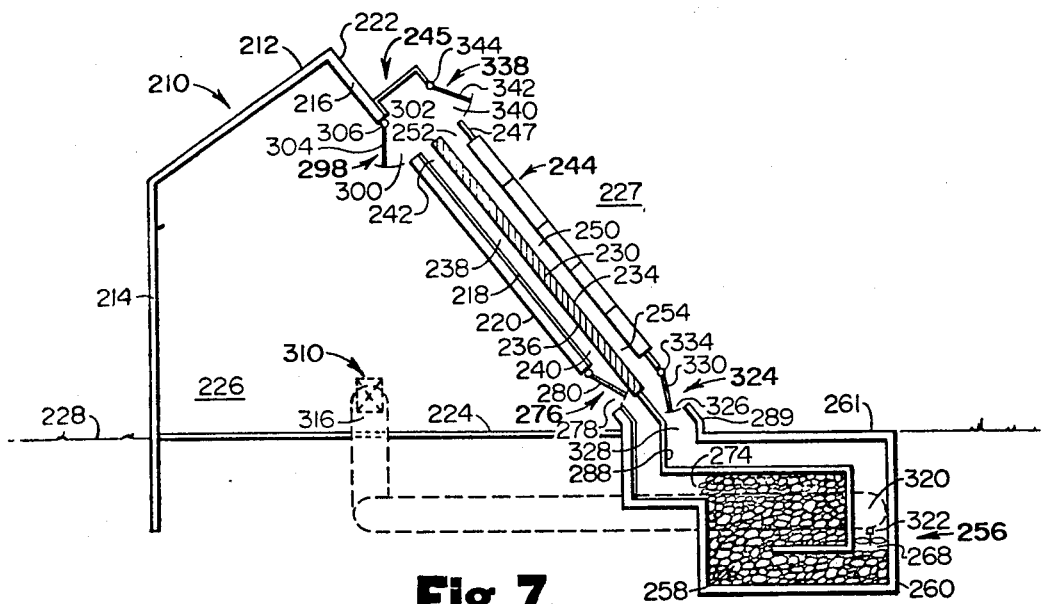
FIG. 7 is a vertical section through existing structure as shown in FIG. 6 utilizing the present invention.

An alternative embodiment of this invention shows an apparatus for controlling building environment by use of circulating air and the ambient environment which apparatus is attached to and used in connection with existing structures. Referring now to the drawings, an existing structure 210 is shown in FIG. 6 and FIG. 7. As with any conventional house or building, the existing structure shows a roof 212 and wall 214. Generally, an existing structure has one portion of its roof which is oriented more towards the sun than other portions of the roof. Therefore, a second roof 216 as part of the existing structure is the portion of the existing roof which is more oriented towards the sun. Roof 216 has an inner surface 220 and outer surface 222. A floor 224 completes the elements that are found in an existing structure. Roof 212 and 216, wall 214 and floor 224 as before stated may be insulated in accordance with various standard building practices within a locale to improve the efficiency of this apparatus. Roof 212, walls 214, roof 216, and floor 224 generally define the building or house environment 226 of the existing structure 210. The existing structure is situated within an ambient environment 227 which is the weather conditions on any given day. The structure rests on ground 228.

As before, means for collecting the solar heat is provided. A solar collector 230 is shown in FIG. 7 as a flat plate having a front surface 234 and back surface 236. This solar collector as in the first embodiment may be made from a suitable material which is capable of absorbing solar radiation and becoming hot from such radiation. The solar collector 230 is disposed in a position generally parallel to roof 216 within a frame box 245 to form channel 238 with a bottom 218 of said frame box. Frame box 245 is then mounted to surface 222 of roof 216. The collector 230 is oriented so as to obtain optimum radiation. Channel 238 allows circulating air to pass through it from its admitting end 240 through its exhausting end 242. As a means of preheating, as in the first embodiment, the circulating air is passed into channel 238 through admitting end 240 and while therein comes in contact with the back surface 236 of collector 230 which has been heated by the sun. The heat from surface 236 is then transmitted to the circulating air which then in turn passes through exhausting end 242. Exhausting end 242 is in circulating air communication with a collection chamber 302.

In order to provide protection and separation of the solar collector 230 from the environment, solar admitting panels 244 are provided. As in the first embodiment these panels are generally flat surfaces and may be manufactured from glass, plastic or the like which material will allow radiation from the sun to pass through them and strike collector 230. Panels 244 are disposed with one surface parallel to the front surface 234 of collector 230 and are held in position by frame box 245. Frame box 245 is constructed in such fashion as to form channel 250 between front surface 234 of the collector and one surface of panels 244. The other surface of panels 244 are faced to and in contact with ambient environment 227 and serve as an exterior cover for frame box 245. Channel 250 has an admitting end 252 in circulating air communication with Chamber 302 and an exhausting end 254. Chamber 302 is defined by bottom 218, top 247 and sides 249 of frame box 245 as shown in FIGS. 6 and 7. This allows air to be admitted through end 252 of channel 250 from the collection chamber 302, passed through channel 250, and be exhausted through end 254. While the circulating air is passing through channel 250, such air comes in contact with surface 234 of collector 230, which collector has been heated by solar radiation, and raises the temperature of such circulating air as the result thereof. The heated air is then exhausted through end 254.

As with the apparatus as illustrated in FIG. 1 and FIG. 2, the alternate embodiment illustrated in FIG. 6 and FIG. 7 uses a thermal storage unit 256 which in all respects is constructed in substantially the same fashion as thermal storage unit 56 except that with an existing structure the thermal storage unit 256 is constructed next to the existing structure rather than under it. Storage unit 256 is comprised of a storage medium 258 which is porous and allows air to circulate there through. The storage unit may be made by excavating the ground to form walls 260 and placing medium 258 in the excavation and covering it with top 261. Circulating air may then pass through end 268 of the storage unit, circulate through the storage unit and exhaust through end 274. As heated or cooled air circulates through the storage unit, the heat or cold is transferred to medium 258 and stored for later use.

As before, a means is provided for directing the circulating air from the storage unit 256 to either the building environment 226 or to the preheating channel 238. As shown in FIG. 7, a valve 276 may be used for directing the circulating air. An opening 278 through roof 216 is provided in order to allow the air to pass from storage 256 from exhaust end 274 of said storage unit into building environment 226. To retard or restrict the flow through opening 278, a cover 280 is provided. Cover 280 is substantially similar to cover 80 as shown in FIGS. 3 and 4 responds and is controlled in a substantially similar fashion.

Means for exhausting the building environment 226 is also provided. A valve 298, similar to that shown valve 76 in FIGS. 1 and 2 is shown near the apex of structure 210 in FIG. 7 and is also similar to valve 276. Valve 298 is comprised of an opening 300 through roof 216 similar to opening 278 at valve 276. Opening 300 allows circulating air to flow from the building environment 226 through to collecting chamber 302. Valve 298 additionally has a flat cover 304 similar to cover 280 of valve 276. Cover 304 is pivotally connected at one of its edges by a hinge 306 to one side of opening 300. The operation of valve 298 and the determination of its being open or closed is substantially similar to the control and action of valve 98 in FIGS. 1 and 2.

Additional exhausting of the building environment 226 may be desired. Therefore, additional means of exhausting is provided as before. In this regard a valve 310 is provided in the form of a conventional register in FIG. 7. An opening through wall 217 is provided. A duct 314 having a first end 316 is attached to a valve 310 through wall 217 in circulating air communication with environment 226 of the building. The other end 318 of duct 314 opens into circulating air communication with admitting end 320 by blower 322. Valve 310 covers and 316 of duct 314 and may be selectively opened or closed. When valve 310 is in the open mode, circulating air may flow from environment 226 into end 316 of duct 314, through duct 314 to the admitting end 320 of blower 322. When valve 310 is selectively closed, circulating air is restricted and prevented from flowing through duct 314.

As previously shown in the first embodiment it is sometimes desirable to draw air from the ambient environment 227. Therefore, means for receiving air from environment 227 into the circulating air system is provided by way of valve 324 shown in FIGS. 6 and 7. Again valve 324 is similar to valve 276. An opening 326 through top 247 of framing box 245 is provided near and above ground level 228. Opening 326 is oriented to enter below the exhausting end 254 of primary heating channel 250. The opening 326 is similar to opening 278 of valve 276. Air from the ambient enters through opening 326 into channel 328 which is defined by wall 288 and side 289 of framing box 245. A cover 330 is provided and attached by means of a hinge at 334 to framing box 245 at the edge of opening 326 nearest solar admitting panels 244. This valve 324 functions in a substantially similar fashion to valve 124 in FIG. 2.

To exhaust circulating air into the ambient environment 227, a means is provided by way of valve 338 shown in FIGS. 6 and 7 at the apex of structure 210 and is again similar to valve 276. Said valve 338 consists in part of an opening 340 through top 247 of framing box 245 above the solar admitting panels 244. Opening 340 opens into and is in air contact with chamber 302. This allow circulating air to flow from collecting chamber 302 through 340 into environment 227. The opening 340 is similar to opening 278 of valve 276. A cover 342 is provided to fit over opening 340. Cover 342 is attached by one edge to the edge of opening 340 by hinge 344 located furthest distance from solar admitting panels 244. Additionally, cover 342 is attached in such fashion as to allow said cover 324 to pivot outwardly away from the collecting chamber 302 and about the hinge at 344. Valve 338 operates in substantially similar fashion and is operated in conjunction with the other valves as valve 138 as shown in FIGS. 1 and 2.

Air must be circulated through the apparatus as shown in FIGS. 6 and 7. Means for circulating the air is therefore provided in the form of a conventional blower 322 as shown in FIG. 7. The blower shown in FIG. 2 is substantially similar to the one shown in FIG. 7 and in all respects is placed and operated in similar fashion.

To illustrate how the system functions, a flow diagram is shown in FIG. 5. Therein valves are shown schematically as they are within the actual apparatus. As previously discussed, at various times valves are either in the open or closed mode. It will be appreciated by those skilled in the art that the structurally integrated system shown in FIG. 1 and FIG. 2 functions in the same fashion as the add-on unit shown in FIG. 6 and FIG. 7. Therefore the following cycles are equally applicable to both systems even though only one is discussed for purposes of explaining the various cycles of the apparatus during heating or cooling. A first cycle is to heat the storage medium 58 for use in heating the building environment 26 at a later time. All valves are in the closed mode which causes a closed loop of circulating air. Circulating air is preheated in pre-heat channel 38 and then drawn by blower 122 into collection chamber 102. From collection chamber 102, air circulates to primary heat channel 50 for its final heating. The heated air is drawn by blower 122 from primary heat channel 50 through blower 122 and forced into the lower level storage 64. The heat is then transferred to medium 58 within said lower level 64. The air then circulated to the upper level storage 66 where the heated air deposits more heat to medium 58. Thereafter, the air is circulated back to the preheat channel 38 to begin the cycle again. To make the heater function, radiation of solar collector 30 must occur. As the air continues to cycle through the system, the medium 58 in storage unit 56 continues to heat until the system stabilizes. Thermostatic detection of this stabilization might by way of example be used to control the blower 122.

During the evening or darkness, for example, or at other times, it may be desired to heat building environment 26. To facilitate this, valve 76 is opened to building environment 26 and valve 110 is opened to allow air to exhaust from environment 26. All other valves are closed. Thus, the cycle includes drawing air from the building environment 26 by blower 122, through blower 122 into lower level storage 64. The air is forced through the lower level 64 and is heated by the medium 58, which medium has been previously heated as in the first cycle. The air is then passed through upper level storage 66 and is additionally heated by medium 58. The heated air is then drawn into the building environment 26 which environment is heated thereby. As the air cools, it gravitates toward the floor 24 and is drawn out of environment 26 through valve 110 to begin the cycle again. This heating cycle may continue until the medium 58 is storage until 56 becomes too cool to raise the building environment 26.

A third heating cycle for the system is also demonstrated. Heating of the building environment 26 may be desired during a time when ambient conditions are such that the preheat channel 38 and primary heat channel 32 are heated by solar collector 30. In turn circulating air is heated within said channels. Valve 76 is partially closed and thus allows air to circulate from the upper level storage 66 to the building environment 26 and the preheat channel 38. Valve 98 is in the open mode and allows air to flow from the building environment 26 into collection chamber 102. All other valves are in the closed mode. Air is drawn through preheat channel 38 where it is heated. The air is then drawn into the collection chamber 102. At the same time, air from the building environment 26 is drawn into collection chamber 102 through valve 98 and mixes with air from the preheat channel 38. The mixed air is then drawn into and through primary heat channel 50 where it is heated further. Thence, the air is drawn into and through blower 122 and forced into the lower level storage unit 64. There heat is transferred to the medium 58 and forced on into upper level storage 66 where additional heat from the air is transferred to medium 58. The heated air is then carried to valve 76 at which point part of the air is diverted to the building environment 26 and the rest to the preheat channel 38 to begin the cycle again. The air diverted to the building environment 26 in turn heats the surroundings.

Several different cooling cycles are presented within the system. The first cycles presented is used to store "cold" for use in cooling the building environment 26 when desired. This cycle is commenced when the ambient environment 27 is cool which is usually in the evening or early morning hours. Valve 124 is opened which allows the ambient air to flow into the system. Air is not permitted to flow from the primary heat channel 50. Valve 138 is also opened to allow air to flow from the system to the environment 27. All other valves are closed. The blower 122 is activated and draws air in through valve 124 and pulls it through via blower 122. The air is then circulated to the lower level storage 64 and medium 58 is cooled by the cool air. This air is next forced into upper level storage 66 by the blower and the medium 58 there is also cooled. From the upper level storage 66, air is passed through the preheat channel 38 into collection chamber 102. Air is then passed from the collection chamber 102 to the ambient environment 27.

The next cooling cycle is used to cool building environment 26 when the ambient environment 27 is hot. The medium 58 in the storage unit 56 is already cooled as above. Valve 76 is opened to the building environment 26 and circulation to preheat channel 38 is prevented. Valve 110 is opened to allow air to flow from building environment 26 into the return duct 114 which in turn deposits the air just above the blower 122 input. Blower 122 is actuated and air is drawn from the building environment 26 through duct 114 to blower 122. The air is passed through the blower 122 and forced into lower level storage 64. The air then cooled by the cooled medium 58 and passed into an upper level storage 66. The air is cooled further in the upper level 66 and is then passed into the building environment 26 through valve 76. The cooled air which is circulated into environment 25 lowers the temperature. As the air warms, it is exhausted through valve 110 to begin the cooling process over again.

A third cooling cycle is also provided. This cycle is employed when the ambient environment 27 is cool and it is desired to cool building environment 26. Valve 124 is opened to allow cool ambient air to flow into the system and restrict air flow from the primary heat channel 50. Valve 76 is opened to allow air to flow into the building environment 26 and restrict flow to the preheat channel 38. Valve 98 is opened to allow air from the building environment to flow into collection chamber 102. Valve 138 is opened to allow air from the collection chamber 102 to flow to the ambient environment 27. Valve 110 is closed. When the blower 122 is actuated, air is drawn through valve 124 into the system and forced through the blower 122 into lower storage level 64. The cool air cools the medium 58 and then passed to upper level storage 66 where further cooling of medium 58 takes place. The air is then circulated through valve 76 into the building environment 26. As the building environment cools the warmer air, tends to rise toward valve 98. It is then drawn through valve 98 into collection chamber 102 from which it is then exhausted through valve 138 to the ambient environment 27. This continues until the desired temperature is accomplished. The blower 122 may be actuated as needed to maintain the building environment 26 at a desired level.

It will be appreciated by those skilled in the art that even though one side of the solar collector 30 and solar collector 230 has been designated as the preheat channel and the other side of each of said solar collectors has been designated as the primary heat channel the roles of preheat channel and primary heat channel could be interchanged by reversing the flow of the circulating air through the apparatus.

While a preferred embodiment of the invention has been described using specific terms, such description is for illustrative purposes only, and it will be recognized by those skilled in the art that changes and variations may be made without departing from the spirit and scope of the following claims.

What is claimed is:

1. An apparatus for controlling building environment by use of circulating air and the ambient environment comprising:
   a solar collector with a front side and back side;
   a preheating channel for preheating the circulating air which is in heating contact with one of said sides of said solar collector;
   a primary heating channel for heating circulating air which is in heating contact with the other of said sides of said collector;
   a collection chamber for collecting circulating air from a selection of one of the building environment and the preheating channel and distributing the air to the primary heating channel and selectively to the ambient environment;
   a means for selectively introducing air from said collection chamber into the ambient environment;
   a means for storing the heat or cold from the circulating air;
   a means for introducing the circulating air to said storing means from one of a selection of ambient environment air and air from the primary heating channel;
   a means for introducing the circulating air from the storage means to one of a selection of the building environment and said preheating channel;
   a means for selectively exhausting the circulating air from the building environment to said collection chamber;
   a means for selectively exhausting the circulating air from the building environment to said storage means; and
   a means for circulating the air.

2. An apparatus for controlling building environment by use of circulating air and the ambient environment comprising:
   a means for solar heating the circulating air;
   a means for storing heat and cold having a lower storage level and upper storage level in air circulating communication with each other whereby one level is a primary thermal sink and the other level is a secondary thermal sink;
   a means for introducing circulating air from a selection of one of the ambient environment and said heating means into one of said storage levels;
   a means for introducing circulating air from the other level of said storage means to one of a selection of the building environment and said heating means;
   a collection chamber for collecting the circulating air from the heating means and selectively from the building environment and introducing said air to said heating means and selectively to the ambient environment;
   a means for selectively introducing circulating air from said collection chamber to the ambient environment;
   a means for selectively exhausting the building environment to said collection chamber;
   a means for selectively exhausting the building environment to one level of said storage means; and
   a means for circulating the air.

3. The apparatus of claim 2 wherein said solar heating means includes a solar collector with a front side and a back side and further comprising a preheating channel for preheating the circulating air in heating contact with one of said sides of said solar collector and a primary heating chamber for heating the circulating air in heating contact with the other side of said solar collector.

4. The apparatus of claim 1 wherein one side of said preheating channel is formed by said solar collector, said preheating channel having an admitting and an exhausting end, whereby the circulating air enters said preheating channel through said admitting end, the circulating air is heated by said solar collector, and the heated circulating air is exhausted through said exhausting end.

5. The apparatus of claim 1 wherein one side of said primary heating channel is formed by said solar collector, said primary heating channel having an admitting end and an exhausting end, whereby the circulating air enters said channel through said admitting end, the circulating air is heated by said solar collector, and the heated circulating air is exhausted through said exhausting end.

6. The apparatus of claim 1 wherein said storage means includes rocks for absorbing heat or cold.

7. The apparatus of claim 2 wherein said storage means includes rocks for absorbing heat or cold.

8. The apparatus claimed in claim 1 wherein said solar collector, said preheating channel, said primary heating channel, said collection chamber, said means for selectively introducing air from said collection chamber into the ambient environment, said means for introducing the circulating air to said storage means from one of a selection of ambient environment air and air from the primary heating channel, said means for introducing the circulating air from the storage means to one of a selection of the building environment and said preheating channel, said means for selectively exhausting the circulating air from the building environment and said collection chamber and said means for selectively exhausting the circulating air from the building environment to said storage means are contained within a framing means whereby said framing means is mounted to a building structure.

* * * * *